US011620480B2

(12) United States Patent
Okuno

(10) Patent No.: US 11,620,480 B2
(45) Date of Patent: Apr. 4, 2023

(54) LEARNING METHOD, COMPUTER PROGRAM, CLASSIFIER, AND GENERATOR

(71) Applicant: AXELL CORPORATION, Tokyo (JP)

(72) Inventor: Shuji Okuno, Kashiba (JP)

(73) Assignee: AXELL CORPORATION, Tokyo (JP)

( * ) Notice: Subject to any disclaimer, the term of this patent is extended or adjusted under 35 U.S.C. 154(b) by 10 days.

(21) Appl. No.: 16/698,252

(22) Filed: Nov. 27, 2019

(65) Prior Publication Data

US 2020/0210783 A1 Jul. 2, 2020

(30) Foreign Application Priority Data

Nov. 28, 2018 (JP) .............................. JP2018-222302

(51) Int. Cl.
| | | |
|---|---|---|
| *G06K 9/62* | (2022.01) | |
| *G06N 3/08* | (2006.01) | |
| *G06N 3/04* | (2006.01) | |
| *G06V 10/42* | (2022.01) | |
| *G06V 10/44* | (2022.01) | |
| *G06V 10/772* | (2022.01) | |
| *G06V 10/82* | (2022.01) | |
| *G06N 3/088* | (2023.01) | |

(52) U.S. Cl.
CPC ......... *G06K 9/6265* (2013.01); *G06K 9/6256* (2013.01); *G06N 3/088* (2013.01); *G06N 3/0454* (2013.01)

(58) Field of Classification Search
CPC .............. G06K 9/6265; G06K 9/6256; G06K 9/6255; G06K 9/522; G06K 9/4628; G06N 3/088; G06N 3/0454; G06N 3/0472
See application file for complete search history.

(56) References Cited

U.S. PATENT DOCUMENTS

| | | | |
|---|---|---|---|
| 2015/0134578 A1 | 5/2015 | Tamatsu et al. | |
| 2018/0075581 A1* | 3/2018 | Shi | ......................... G06N 3/084 |
| 2018/0137389 A1* | 5/2018 | Mathieu | ............... G06N 3/0445 |

(Continued)

FOREIGN PATENT DOCUMENTS

| | | |
|---|---|---|
| JP | 2000-032271 A | 1/2000 |
| JP | 2015-95212 A | 5/2015 |
| WO | WO2018/203374 A1 | 11/2018 |

OTHER PUBLICATIONS

Song, Jingzhou et al., "Automatic Coloring Method of Storyboard using Machine-learning," *ITE Journal, Japan, The Institute of Imaging Information and Television Engineersl*, vol. 42, No. 12, Mar. 9, 2018, pp. 233-236, 7 pages.

(Continued)

*Primary Examiner* — John W Lee
(74) *Attorney, Agent, or Firm* — Masuvalley & Partners; Peter R. Martinez

(57) ABSTRACT

In a learning that uses a machine learning model for an image, a learning method, a learning model, a classifier, and a generator in which human vision is taken into consideration are provided. The learning method learns a machine learning model that inputs or outputs image data with data for learning that includes training data subjected to a process of leaving out a component that is difficult to visually judge to reduce an information amount or generated data at a predetermined ratio.

10 Claims, 10 Drawing Sheets

(56) References Cited

U.S. PATENT DOCUMENTS

2018/0293496 A1* 10/2018 Vogels .................... G06N 3/04

OTHER PUBLICATIONS

Ohya, Takafumi, et al., "Basic Study of Stochastic Auto Colorization of Luminance Image by using Generative Network," *The Proceedings of the 31st Picture Coding Symposium of Japan; The Proceedings of the 21st Image Media Processing Symposium, Japan, IEICE*, Nov. 16, 2016, pp. 78-79, 5 pages.

* cited by examiner

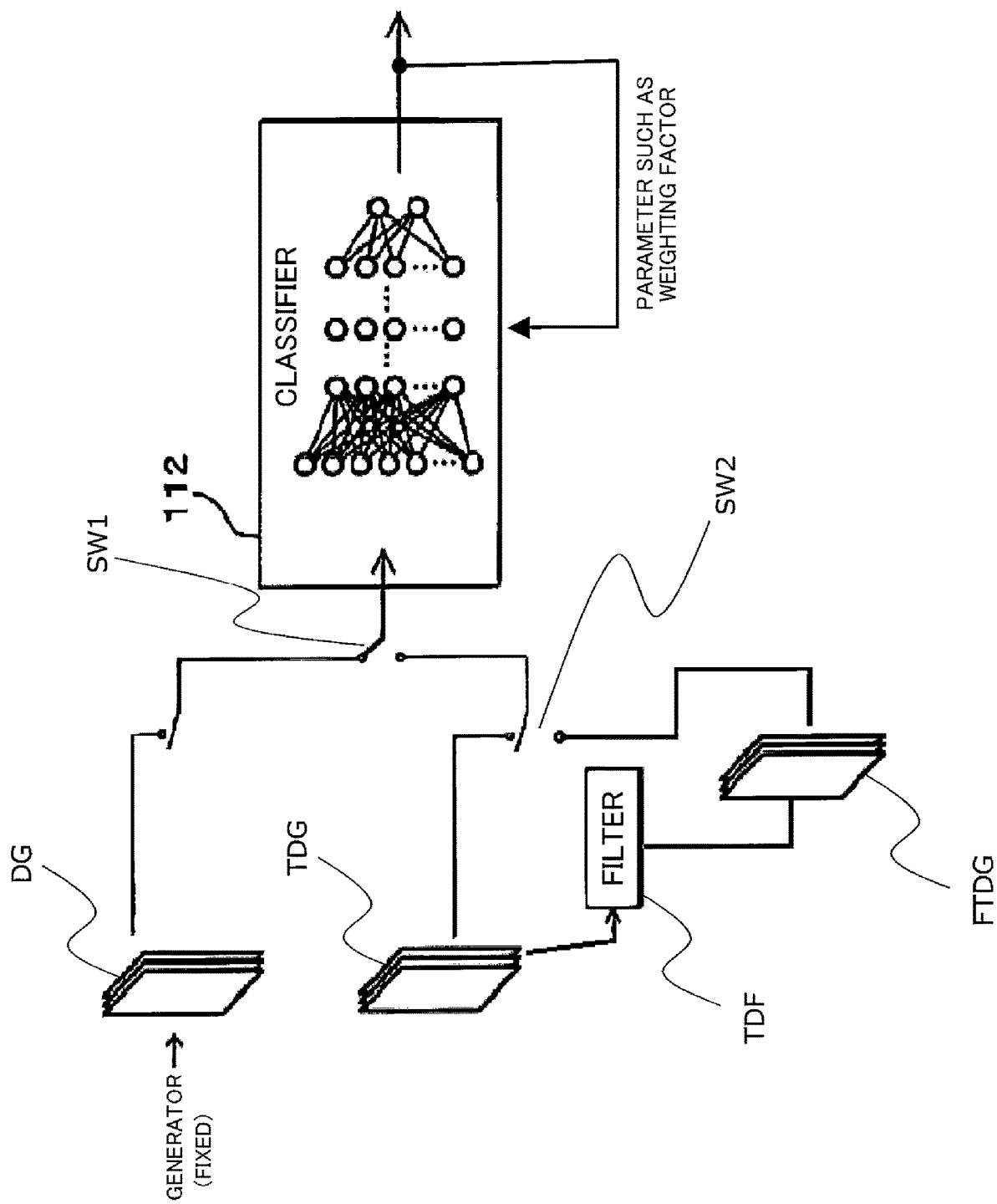

LEARNING METHOD, COMPUTER PROGRAM, CLASSIFIER, AND GENERATOR

FIELD

The present invention relates to a learning method of a machine learning model that processes image data, a computer program, a classifier, and a generator.

BACKGROUND

Image recognition, judging, generation methods using a machine learning model, and the like require a huge amount of training data. Therefore, it is known that a recognition performance can be improved by performing data augmentation, such as scaling, rotation, inversion, shift, color conversion, and noise addition, for image data in order to increase the number of pieces of the training data (For example, Japanese Patent Application Laid-open No. 2015-095212).

CITATION LIST

Patent Literature

Patent Literature 1: Japanese Patent Application Laid-open No, 2015-095212

Data augmentation is on the assumption that it does not lose any feature of an original image. In data augmentation for a judging device, processing is performed not to have any influence on a judging result (a class), to such a degree that a judging result showing what an object captured in an image is, that is, the appearance that what the object looks like is not changed.

The inventors have further had a finding that omission of learning with regard to elements included in image data, which do not have any influence visually, may enable the mechanism of human vision to be employed in a machine learning model to be learned.

The present invention is based on this finding and it is an object of the present invention to provide a learning method, a learning model, a classifier, and a generator in which human vision is taken into consideration in a learning using a machine learning model for an image.

SUMMARY OF THE INVENTION

A learning method according to a first aspect of the present invention performs a process of learning a machine learning model that inputs or outputs image data as a classifier, by giving data for learning that includes, at a predetermined ratio, image data in which an information amount of a component that is difficult to visually judge is reduced, to the machine learning model.

In a learning method according to a second aspect of the present invention, a process of giving data for learning that includes image data in which a component chat is difficult to visually judge is left out to reduce an information amount at a predetermined ratio to a machine learning model that is defined to, when image data is input, output a classification of the input image data, and learning the machine learning model as a classifier, is caused to be performed.

In a learning method according to a third aspect of the present invention, a process of, using a machine learning model for image generation that is defined to, when any data is input, output specific image data and a machine learning model for classification that is defined to, when image data output from the machine learning model for image generation or other image data is input, output a classification of the input image data, and using data for learning that includes image data in which a component that is difficult to visually judge is left out to reduce an information amount at a predetermined ratio, learning the machine learning model for classification and the machine learning model for image generation by GAN (Generative Adversarial Networks), is caused to be performed.

In a learning method according to a fourth aspect of the present invention, in addition to the learning method according to the third aspect, a process is caused to be performed in which a loss function of the machine learning model for classification is calculated by reducing an information amount at a predetermined ratio of both or either one of the image data output from the machine learning model for image generation and the other image data, and giving the image data with the reduced information amount to the machine learning model for classification, and a loss function of the machine learning model for image generation is calculated by giving the image data output from the machine learning model for image generation to the machine learning model for classification without reducing an information amount thereof.

In a learning method according to a fifth aspect of the present invention, in addition to the learning method according to the third aspect, a process is caused to be performed in which a loss function of the machine learning model for image generation is calculated by reducing an information amount at a predetermined ratio of the image data output from the machine learning model for image generation, and giving the image data with the reduced information amount to the machine learning model for classification, and a loss function of the machine learning model for classification is calculated by giving a predetermined ratio of both or either one of the image data output from the machine learning model for image generation and the other image data to the machine learning model for classification without reducing an information amount thereof.

In a learning method according to a sixth aspect of the present invention, in addition to the learning method according to the first aspect, a process is caused to be performed in which a loss function of a machine learning model that outputs image data is calculated by reducing an information amount at a predetermined ratio of the image data output from the machine learning model or image data given to the machine learning model.

In a learning method according to a seventh aspect of the present invention, in addition to the learning method according to any one of the first to sixth aspects, image data a reduced information amount is generated by preferentially leaving out a component that is difficult to visually judge.

A computer program according to an eighth aspect of the present invention causes a computer to perform processes of: storing therein definition data of a machine learning model that is defined to, when image data is input, output a classification of an image based on the image data; giving data for learn ng to a machine learning model based on the definition data, the data for learning including image data in which a component that is difficult to visually judge is left out to reduce an information amount at a predetermined ratio; and learning the machine learning model as a classifier.

A computer program according to a ninth aspect of the present invention causes a computer to perform processes of: storing therein definition data of a machine learning model for image generation that is defined to, when any data is input, output specific image data and definition data of a machine learning model for classification that is defined to, when image data output from the machine learning model for image generation or other image data is input, output a classification of an image based on the input image data; leaving out a component that is difficult to visually judge at a predetermined ratio of image data output from the machine learning model for classification or image data given to the machine learning model for classification to reduce an information amount; and learning the machine learning model for classification and the machine learning model for image generation by GAN.

A classifier according to a tenth aspect of the present invention comprises: an input layer to which image data is input; an output layer that outputs a classification of an image based on the image data; and an intermediate layer that includes a machine learning model, wherein the classifier is learned by training data including image data for learning that includes image data in which a component that is difficult to visually judge is left out to reduce an information amount at a predetermined ratio, and a classification label of the image data, to cause a computer to output a classification of an input image.

A generator according to an eleventh aspect of the present invention comprises: an input layer to which any data input; an output layer that outputs image data of an image generated based on the data; and an intermediate layer that includes a machine learning model, wherein the generator is learned by GAN including a machine learning model for classification that performs classification whether image data output from the output layer is the image data output from the output layer, by using the image data output from the output layer or data for learning obtained by leaving out a component that is difficult to visually judge to reduce an information, amount at a predetermined ratio of image data given to the machine learning model for classification, and the generator is learned to cause a computer to output image data based on any input data.

With the learning method, the computer program, the classifier, and the generator according to the present invention, is possible to perform learning in which human vision taken into consideration and to perform classification or generation that employs the mechanism of vision for image data.

BRIEF DESCRIPTION OF DRAWINGS

FIG. 6A is an explanatory diagram of learning of the classifier;

DESCRIPTION OF EMBODIMENTS

A learning method, a learning model, a classifier, and a generator according to the present invention are described below with reference to the drawings that illustrate an embodiment. The present embodiment is described by way of example in which processing in the learning method, the learning model, the classifier, and the generator is applied to as image processing device that processes images.

Figure 1:
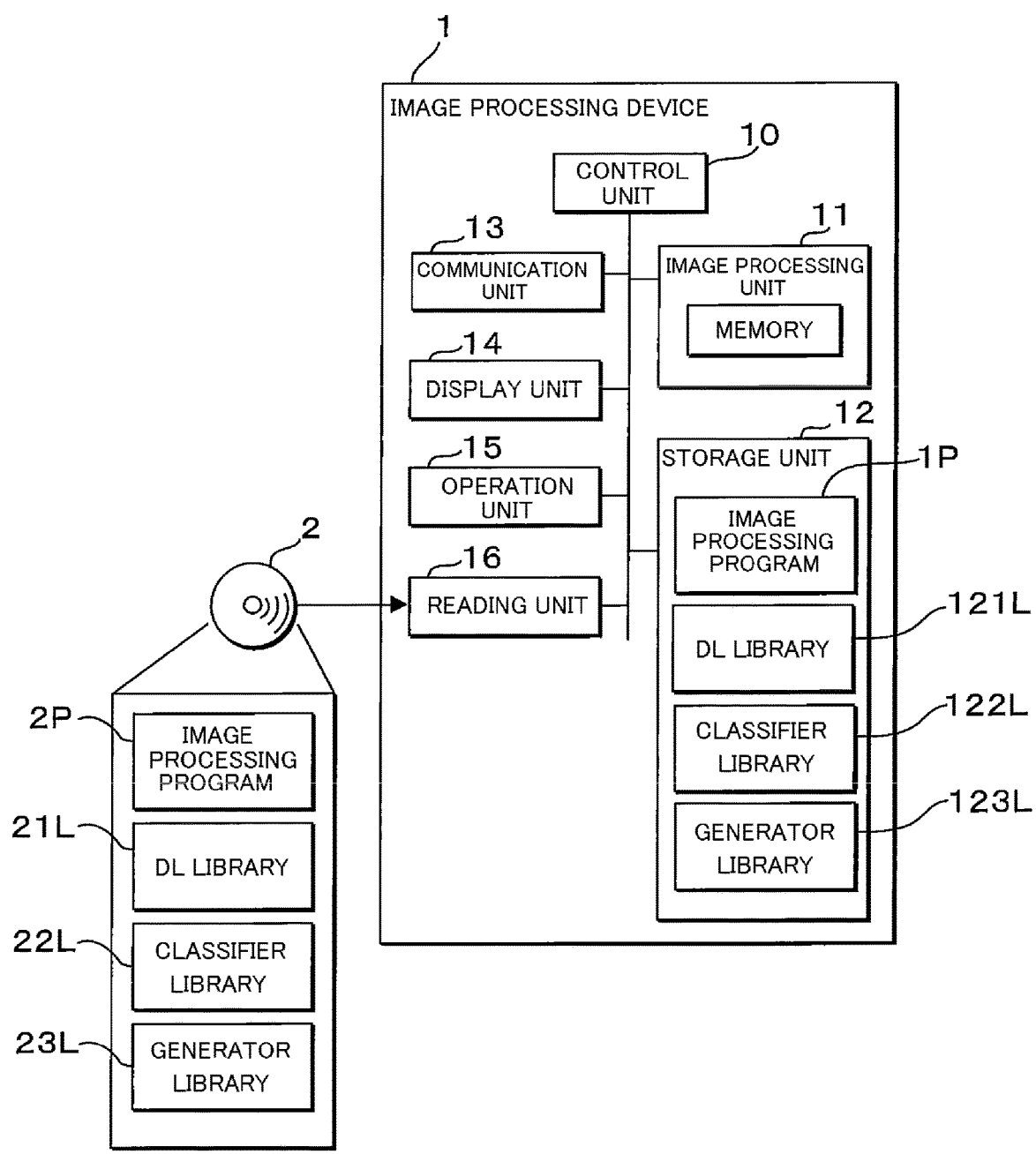
FIG. 1 is a block diagram illustrating a configuration of an image processing device according to the present embodiment.
Figure 2:
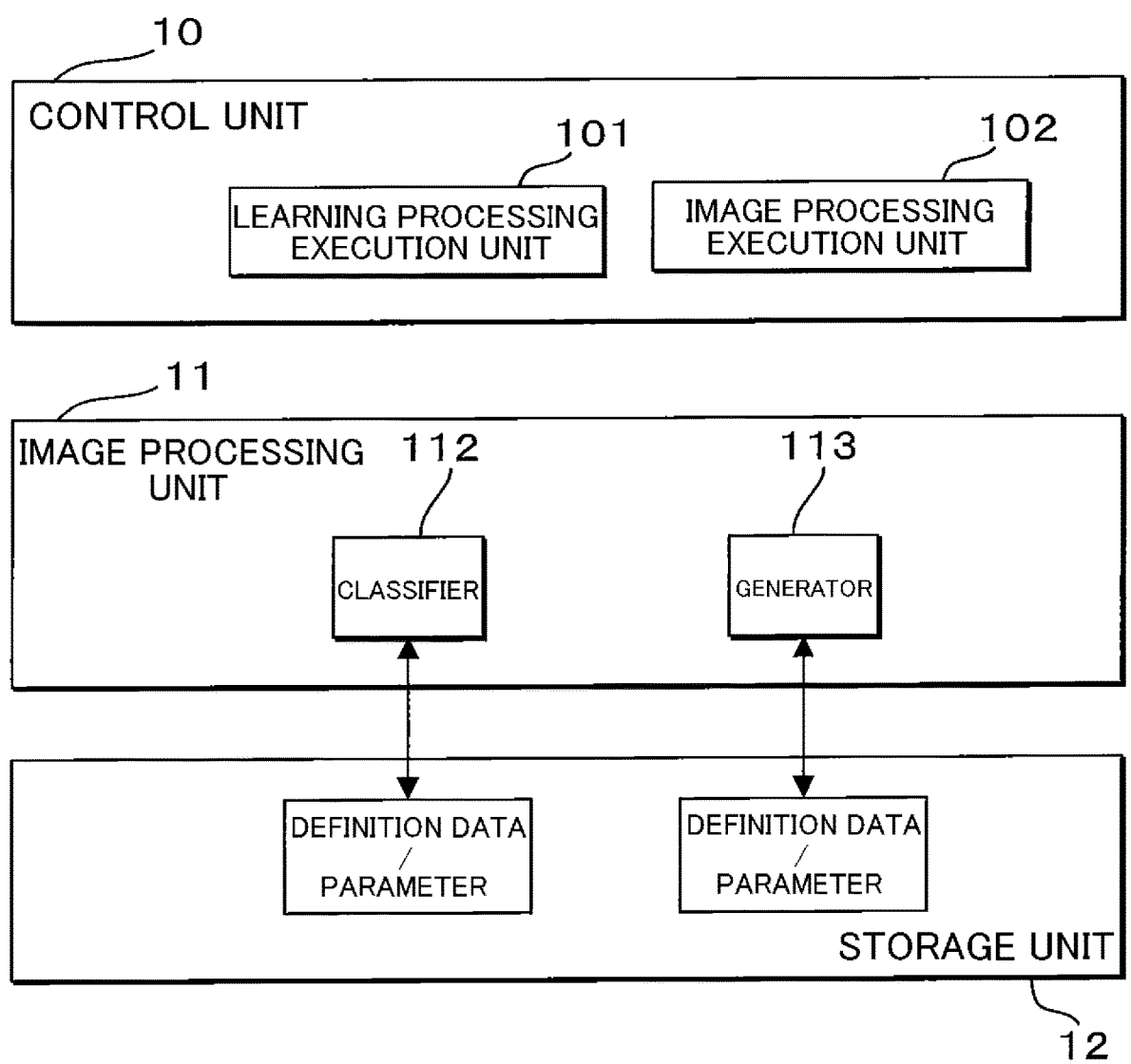
FIG. 2 is a functional block diagram of the image processing device.

FIG. 1 is a block diagram illustrating a configuration of an image processing device 1 according to the present embodiment, and FIG. 2 is a functional block diagram of the image processing device 1. The image processing device 1 includes a control unit 10, an image processing unit 11, a storage unit 12, a communication unit 13, a display unit 14, an operation unit 15, and a reading unit 16. The image processing device 1 and an operation in the image processing device 1 are described as being implemented by one server computer in the following descriptions. However, a configuration may be employed in which processing is performed by a plurality of computers in a distributed manner.

The control unit 10 uses a processor such as a CPU (Central Processing Unit), and a memory, for example, and controls components of the image processing device 1 to implement various types of functions. The image processing unit 11 uses a processor such as a GPU (Graphics Processing Unit) or a dedicated circuit, and a memory to perform image processing in accordance with a control instruction from the control unit 10. The control unit 10 and the image processing unit 11 may be configured as one unit of hardware. The control unit 10 and the image processing unit 11 may be configured as one unit of hardware into which a processor such as a CPU and a GPU, a memory, and the storage unit 12 and the communication unit 13 are integrated (SoC: System On a Chip).

The storage unit 12 uses a hard disk or a flash memory. The storage unit 12 stores therein an image processing program 1P, a DL (Deep Learning) library 121L, a classifier library 122L, and a generator library 123L. Further, the storage unit 12 stores therein information that defines a classifier 12 or a generator 113, which is generated for every learning, parameter information including, for example, a weighting, factor of each layer in the learned classifier 112 and the learned generator 113, and the like.

The communication unit 13 is a communication module that implements communication connection to a communication network such as the Internet. The communication unit 13 uses a network card, a wireless communication device, or a module for carrier communication.

The display unit 14 uses a liquid crystal panel or an organic EL (Electro Luminescence) display, for example. By the processing in the image processing unit 11 in response to an instruction from the control unit 10, the display unit 14 can display an image.

The operation unit 15 includes a user interface such as a keyboard or a mouse. The operation unit 15 may use physical buttons provided in a case. Also, the operation unit 15 may use software buttons displayed on the display unit 14. The operation unit 15 notifies the control unit 10 of information on an operation by a user.

The reading unit 16 can read an image processing program 2P, a DL library 211, a classifier library 221, and a generator library 231 that are stored in a storage medium 2 that uses an optical disk or the like by using a disk drive, for example. The image processing program 1P, the DL library 121L, the classifier library 122L, and the generator library 123L stored in the storage unit 12 may be duplicates of the image processing program 2P, the DL library 211, the classifier library 221, and the generator library 23L read from the storage medium 2 by the reading unit 16 and created by the control unit 10 in the storage unit 12.

The control unit 10 of the image processing device 1 functions as a learning processing execution unit 101 and an image processing execution unit 102 based on the image processing program 1P stored in the storage unit 12. Further, the image processing unit 11 functions as the classifier 112 by using the memory based on the DL library 1211, definition data, parameter information, and the classifier library 1221 that are stored in the storage unit 12. Similarly, the image processing unit 11 functions as the generator 113 by using the memory based on the DL library 121L definition data, parameter information, and the generator library 1231 that are stored in the storage unit 12. In FIG. 2, illustration of the DL library 121L is omitted in the storage unit 12 because the functions of the classifier 112 and the generator 113 are implemented by the DL library 121L.

The function as a machine learning model is provided by the DL library 121L, and definition data such as a layer configuration, and parameters such as a weight of each node, in the machine learning model are provided by the classifier library 122L or the generator library 123L. Typical examples of the DL library 121L are Tensor Flow and Cafe. However, the DL library 121L is not limited to these libraries and any DL library may be used.

The learning processing execution unit 101 performs a process of learning parameters based on the DL library 121L and the classifier library 122L stored in the storage unit 12 and training data provided in a manner described later, to cause a machine learning model to function as the classifier 112. The learning processing execution unit 101 also performs a process of learning parameters based on the DL library 121L and the generator library 123L stored in the storage unit 12 and training data provided in a manner described later, to cause a machine learning model to function as the generator 113. These machine learning models may be each configured by a neural network, for example, and may be configured by a convolutional neural network including a convolution layer.

The image processing execution unit 102 uses the learned classifier 112 to perform a process of acquiring a result that is output when image data is given, or uses the learned generator 113 to perform a process of acquiring image data generated by inputting seed data (any data such as data called a latent variable, image data, or text data) to the generator 113. The image processing execution unit 102 may draw the image data output from the generator 113 as an image and output the image to the display unit 14.

The classifier 112 extracts a feature amount from input image data and classifies the input image data based on the extracted feature amount. In the present embodiment, the classifier 112 configures GAN (Generative Adversarial Networks) for learning of the generator 113 as described later, and therefore classifies the input image data into image data generated by the generator 113 (image data derived from the generator 113) and other image data. The generator 113 generates and outputs image data from seed data input thereto.

Figure 3:
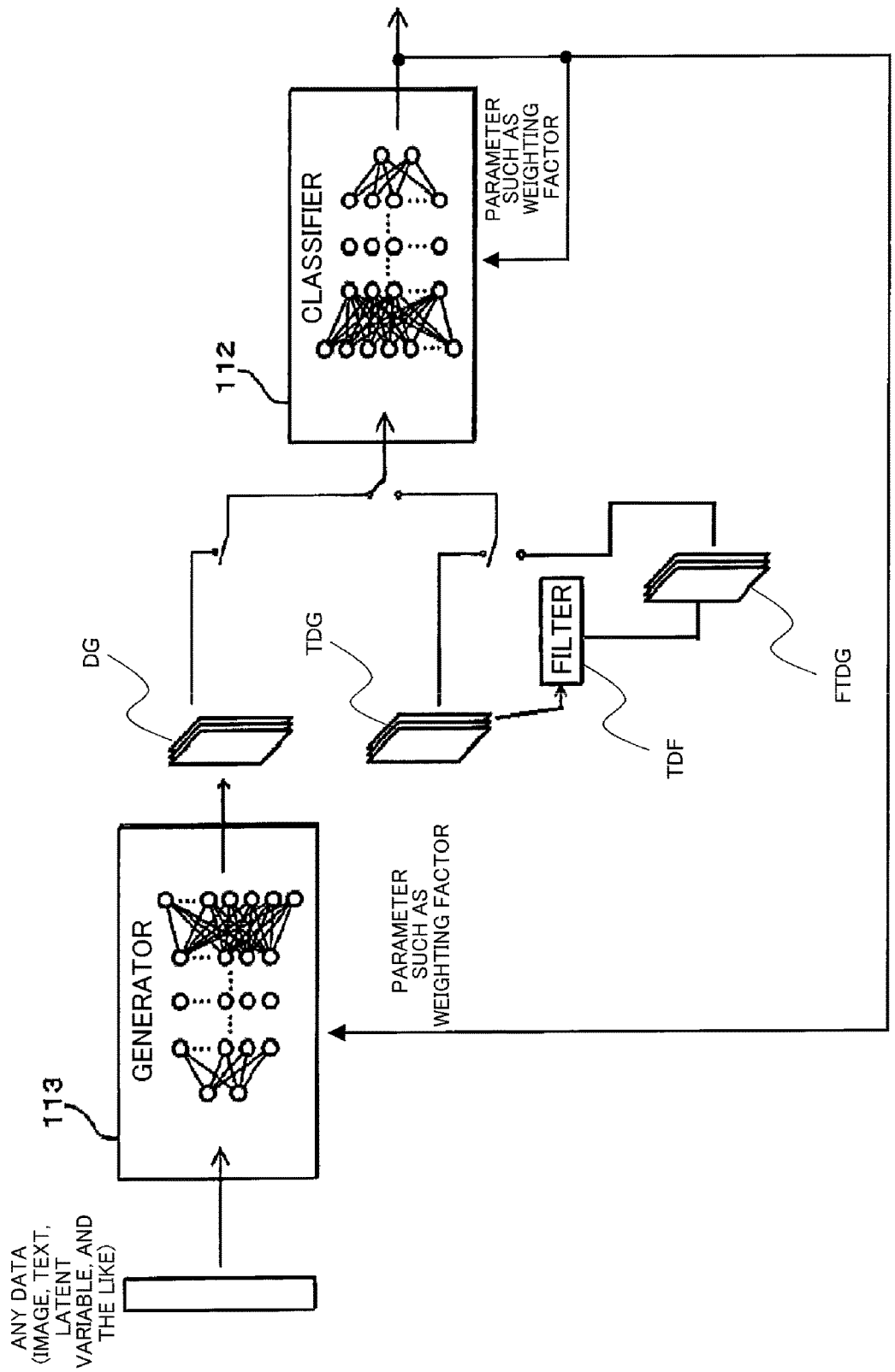
FIG. 3 is an explanatory diagram of the outline of a classifier and a generator.
Figure 4:
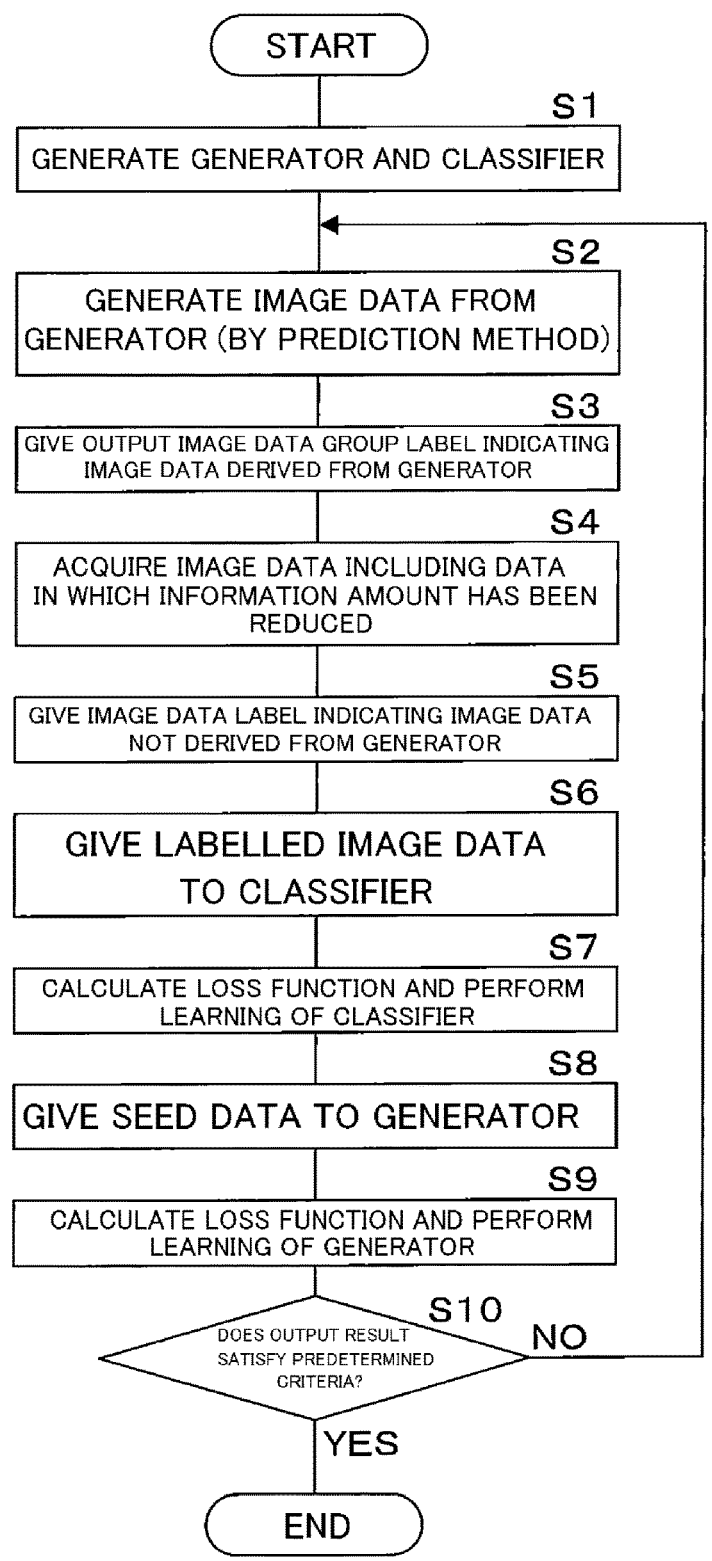
FIG. 4 is a flowchart illustrating an example of a learning processing procedure.

FIG. 3 is an explanatory diagram of the outline of the classifier 112 and the generator 113 in a case of using a neural network as a machine learning model. FIG. 4 is a flowchart illustrating an example of a learning processing procedure. Learning processing by the learning processing execution unit 101 is described referring to FIGS. 3 and 4. The generator 113 is learned by GAN, as illustrated in FIG. 3. Therefore, the classifier 112 and the generator 113 are connected to each other to input an output of the generator 113 to the classifier 112, as illustrated in FIG. 3. Learning by GAN is performed by inputting generated data generated by the generator 113 and training data to the classifier 112 and then setting parameters of the classifier 112 and the generator 113, such as weighting factors, to minimize a determination error in the classifier 112, for example.

The classifier 112 is configured to include a plurality of stages of convolution layers defined by parameters to be learned. The configuration of the classifier 112 is not limited thereto and may include a pooling layer, a fully connected layer, and the like. The generator 113 outputs image data from any data input thereto, by networks defined by parameters to be learned. The generator 113 is configured by appropriately combining networks such as a transposed convolution layer, a convolution layer, and up-sampling, to output image data.

The control unit 10 generates in advance data defining networks as illustrated in FIG. 3 by the learning processing execution unit 101, based on the DL library 121L, the classifier library 22L, and the generator library 123L in the storage unit 12. The control unit 10 generates the generator 113 and the classifier 112 based on definition data generated by a function of the learning processing execution unit 101 (Step S1).

The control unit 10 causes the generator 113 to output an image data group DG as an image data group derived from the generator 113 by a prediction method that predicts an unknown class from seed data (Step S2). The control unit 10 assigns a label indicating image data generated by the generator 113 to the output image data group DG (Step 33).

The control unit 10 acquires, by using image data TDG that is prepared in advance for learning of the classifier 112 as training data for an image data group not derived from the generator 113, image data FTDG filtered by a filter TDF in order to reduce the information amount and the image data TDG in which the information amount is not reduced based on setting information (Step S4). In Step S4, the control unit 10 may define networks in such a manner that a predetermined ratio of the image data prepared in advance is filtered by the filter TDF in FIG. 3. The image data prepared in advance is a photographic image in which a subject in accordance with the purpose of learning is captured or an image that contains an illustration in accordance with the purpose, for example. The control unit 10 assigns a label indicating image data not derived from the generator 113 to the image data (TDG, FTDG) obtained as training data (Step S5).

"Image data in which the information amount has been reduced" in Step S4 is acquired by a filter that performs processing to obtain image data in which a component that is difficult to judge by human eyes is left out. A technique of digital-image compression algorithm is applied as an example of the filter TDF that generates image data for learning of the classifier 112. A filer that uses DCT (Discrete Cosine Transform) in JPEG (Joint Photographic Experts Group) or Wavelet transform can be used, for example.

Use of DCT or Wavelet transform enables limited removal of a component that is difficult to judge by human eyes. For example, in a case of using DCT, it suffices to coarsely quantize high frequency components of a spatial frequency for a result obtained by orthogonal transform of data. In a case of using Wavelet transform, it suffices to cut a component that is small in a high-frequency band in divided bands obtained by orthogonal transform of data. Image data in which a component that is difficult Lo judge visually has been reduced is obtained by controlling a quantization level after DCT is performed or a band-pass filter after Wavelet transform is performed in this manner and further processing an output of the above transform by using inverse discrete cosine transform or inverse Wavelet transform.

It can be said that use of DCT or Wavelet transform means that image data in which a component that is difficult to judge visually (a high frequency component, a component that is small in a high frequency band) is preferentially left out is obtained. The learning processing execution unit 101 may use a filter other than DCT or Wavelet transform. For example, image data in which an information amount has been reduced may be obtained by converting RGB data to YCC data and performing quantization for each channel. The filtered image data FTDG is obtained by decoding the image data in which a component that is difficult to judge visually has been left out in the above-described manner. The filtered image data FTDG is input to the classifier 112.

"Setting information" in Step S4 is defined as definition data in the storage unit 12 to represent a ratio of the image data FTDG, in which the information amount has been reduced, included in an image data group used for learning or a distribution of the numbers or pieces of the image data with respect to the degree of reduction of the information amount. In one example, the degree of reduction of the information amount in the image data FTDG having the reduced information amount is a constant ratio, and the setting information is defined in such a manner that the image data FTDG having the reduced information amount is included in training data at a predetermined ratio. In another example, all image data for learning is image data in which the information amount has been reduced. Further, an image data group may be used in which a visual weight is given to a channel or a band to increase the importance of a portion that is easy to judge visually.

Figure 5:
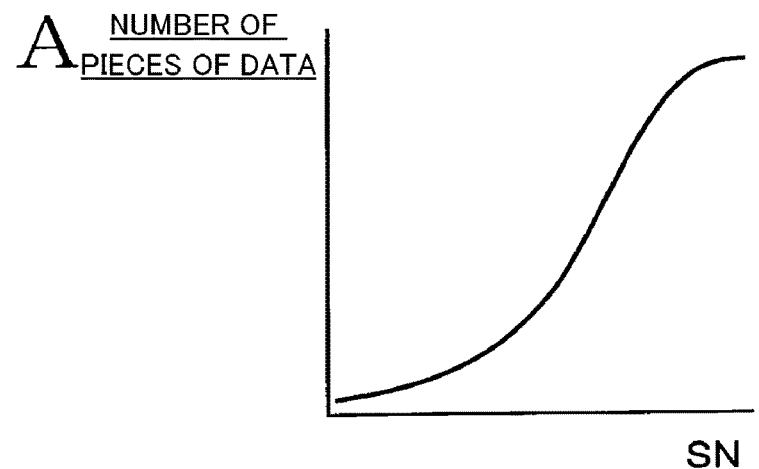
FIGS. 5A to 5C are diagrams illustrating a distribution example of the number of pieces of image data for learning with respect to an SN ratio.
Figure 5:
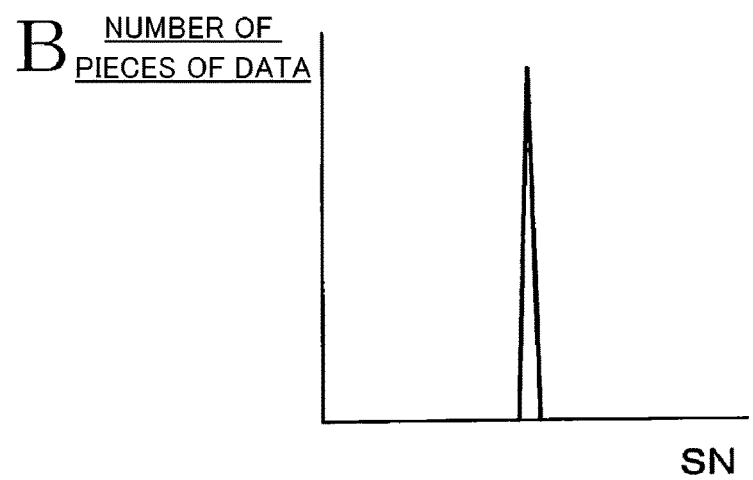
Figure 5:
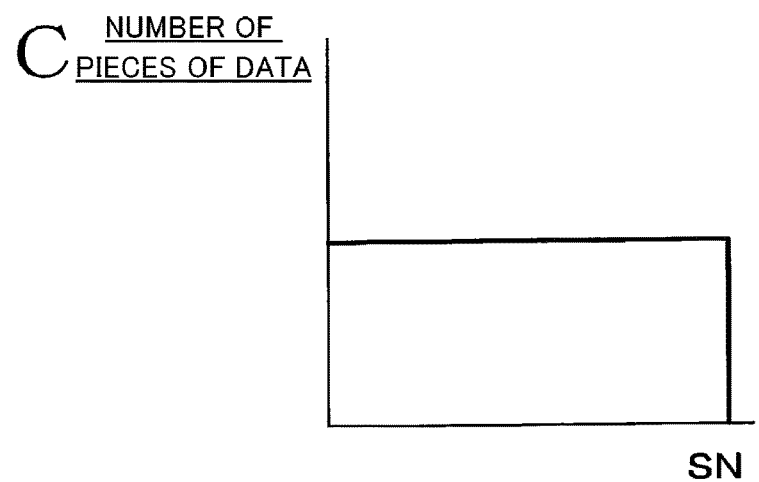

FIGS. 5A to 5C are diagrams illustrating a distribution example of the number of pieces of image data (training data) for learning that have been filtered with respect to an SN ratio related to the reduced information amount. In FIGS. 5A to 5C, the SN ratio is illustrated as being smaller as the amount of reduced information is larger. As illustrated in FIG. 5A, setting information may be defined as a distribution of the number of pieces of image data in which image data for which the SN ratio is low, that is, the amount of reduced information is large is decreased and image data for which the amount of reduced information is large is increased. It suffices that the amount of reduced information is adjusted by coarseness of quantization, for example.

Other than data for learning that has a predetermined distribution as illustrated in FIG. 5A, learning may be performed by using an image data group in which the information amount has been uniformly reduced, as illustrated in FIG. 5B. Further, learning may be performed by using data for learning that has a distribution in which the number of pieces of image data is constant irrespective of the amount of reduced information, as illustrated in FIG. 5C. Other setting, for example, setting in which an image data group with the information amount reduced uniformly is included at 50% and an image data group for which the information amount has not been reduced is included at 50%, can be employed as appropriate.

Referring back to FIGS. 3 and 4, the description is continued.

The control unit 10 gives a labelled image data group obtained by Steps S3 and S5 to the classifier 112 ((Step S6), and calculates a loss function of the classifier 112 and performs learning (Step S7), by a function of the learning processing execution unit 101. Accordingly, regarding image data that is prepared in advance, the classifies 112 is learned by using an image data group for learning that includes image data with the reduced information amount at a predetermined ratio.

Figure 6B:
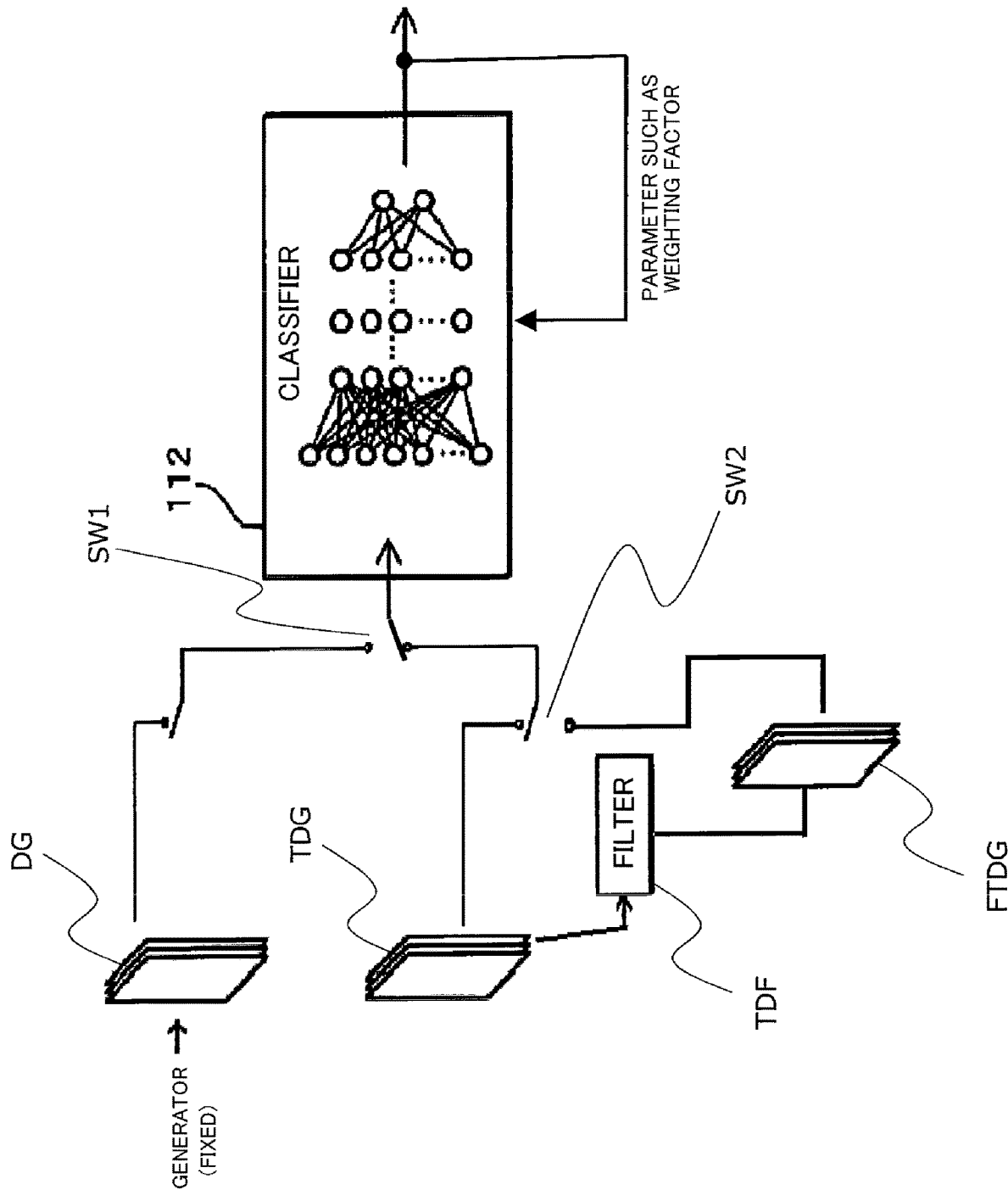
FIG. 6B is an explanatory diagram of learning of the classifier.

As illustrated in FIG. 6A, in learning of the classifier 112, a plurality of pieces of image data DG generated while parameters in the generator 113 are fixed are input to the classifier 112, and parameters in the classifier 112 are set in such a manner that the classifier 112 provides "false determination", that is, determines that the input image data is image data derived from a generator. Further, as illustrated in FIG. 6B, a switch SW1 is switched to input training data TDG to the classifier 112, and the parameters in the classifier 112 are set to provide "true determination".

When the classifier 112 is learned by using training data, the image data TDG as training data and the image data FTDG in which a component that is difficult to judge visually has been reduced by the filter TDF are input to the classifier 112 by switching a switch SW2. As a mixing ratio of the image data TDG as training data and the image data FTDG, it suffices that a ratio illustrated in any of FIGS. 5A to 5C is used, for example. Although each switch is illustrated for convenience of the description, the function of each switch is implemented by switching input data by the control unit 10.

Subsequently, the control unit 10 gives seed data to the generator 113 in networks that include the classifier 112 after being subjected to Step S7, by a function of the learning processing execution unit 101 (Step S8).

The control unit 10 inputs an image data group output from the generator 113 by Step S8 to the classifier 112, and calculates a loss function in the generator 113 based on a determination result of the classifier 112 and performs learning (Step S9). At this time, the control unit 10 fines weighting factors in the classifier 112, and updates parameters in the generator 113 from an output of the classifier 112 that is a result of true-false determination.

Figure 7:
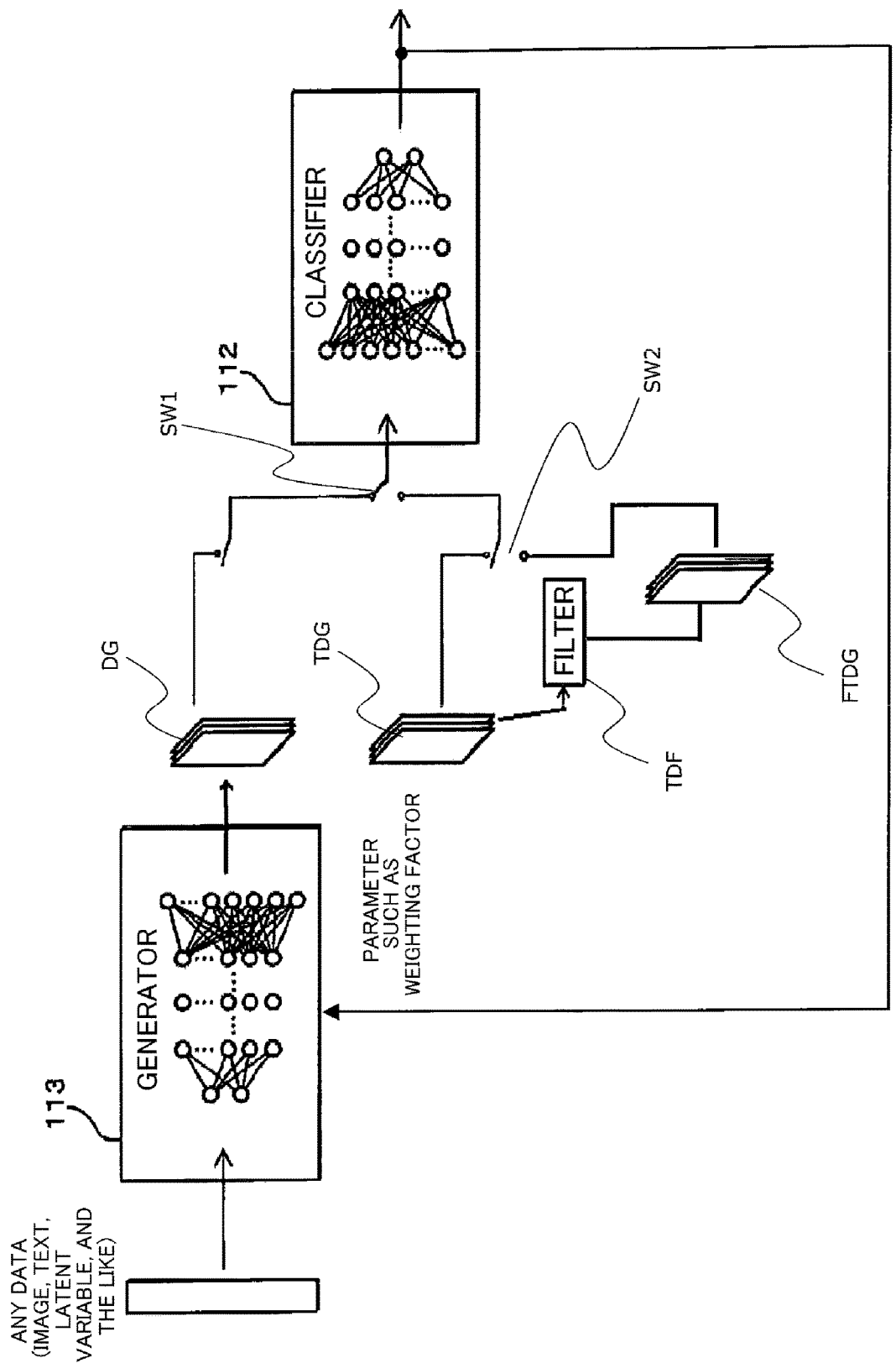
FIG. 7 is an explanatory diagram of learning of the generator.

FIG. 7 is an explanatory diagram of learning of the generator 113. In learning of the generator 113, any seed data is given to the generator 113, a plurality of pieces of image data PG generated by the generator 113 are supplied to the classifier 112, and parameters the generator 113 are set in such a manner that the classifier 112 provides "true determination".

Regarding a loss function in learning of the generator 113, a parameter set may be used as parameters in the classifier 112 which is a result of learning of the classifier 112 by only using image data in which the information amount has not been reduced as training data. Alternatively, a parameter set may be used which is a result of learning of the classifier 112 by using image data in which the information amount has not been reduced and image data in which the information amount has been reduced. Further, a parameter set may be used which is a result of learning of the classifier 112 by only using image data in which the information amount has been reduced.

In learning of the generator 113, it is necessary to set training data in accordance with which data is input and which data is obtained. For example, in a case where photographic data is input as seed data to the generator 113 and cartoon data is generated in the generator 113 from the input photographic data, data that has a feature of "photograph" and data that has a feature of "cartoon" may be used as training data.

Here, it is necessary to compare an output of the generator 113 with the cartoon data in the training data in order to bring the output of the generator 113 close to the cartoon data. However, these data cannot be directly compared with each other by using a mean squared error or the like. Therefore, the image data group generated by the generator 113 is labeled to represent an image derived from the generator 113, the cartoon data in the training data is labeled to represent cartoon data (being true), for example, and the classifier is learned.

Parameters in a loss function of the generator 113 may be set in such a manner that, regarding the classifier 112 learned in this manner, the classifier 112 outputs "true determination" with regard to data obtained by inputting photographic data in the training data to the generator 113.

Meanwhile, in a case where a pair of pieces of training data is obtained as an input and an output of the generator 113, learning can be performed by directly comparing the output of the generator 113 and the training data with each other.

More specifically, in a case of performing a process of improving the resolution of image data in the generator 113, it is possible to perform learning of the generator 113 by preparing a high-resolution image as training data in advance, inputting image data obtained by lowering the resolution of the high-resolution image to the generator 113 as seed data, and using generated high-resolution image data that is output from the generator 113 and original high-resolution data.

Figure 8:
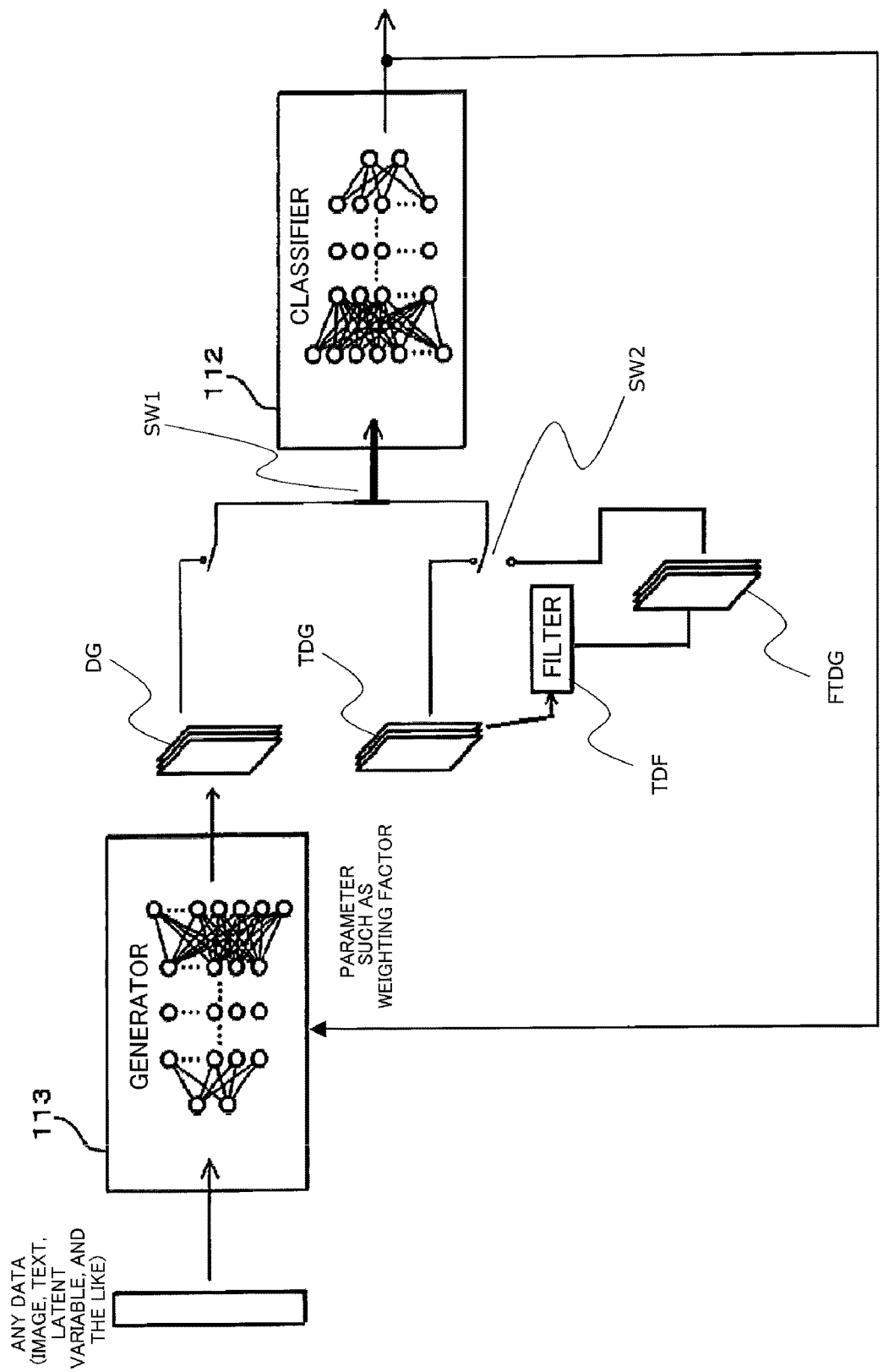
FIG. 8 is an explanatory diagram of learning of the generator.

In this case, it suffice s to update parameters in the generator 113 with a difference between a value obtained when the output of the generator 113 is input to the classifier 112 and a value obtained when the output-side training data is input to the classifier 112. Further, as illustrated in FIG. 8, the generator 113 may be learned by switching the switch SW1 and including a difference obtained by direct comparison between the original image data that serves as training data and image data output from the generator 113, in a loss function.

Also in these cases, it is possible to use not only the original high-resolution training data but also training data in which the information amount has been reduced by the filter TDF. The number of pieces of the training data in which the information amount has been reduced and the degree of reduction of the information amount in each piece of the training data can be set in any manner.

Figure 9:
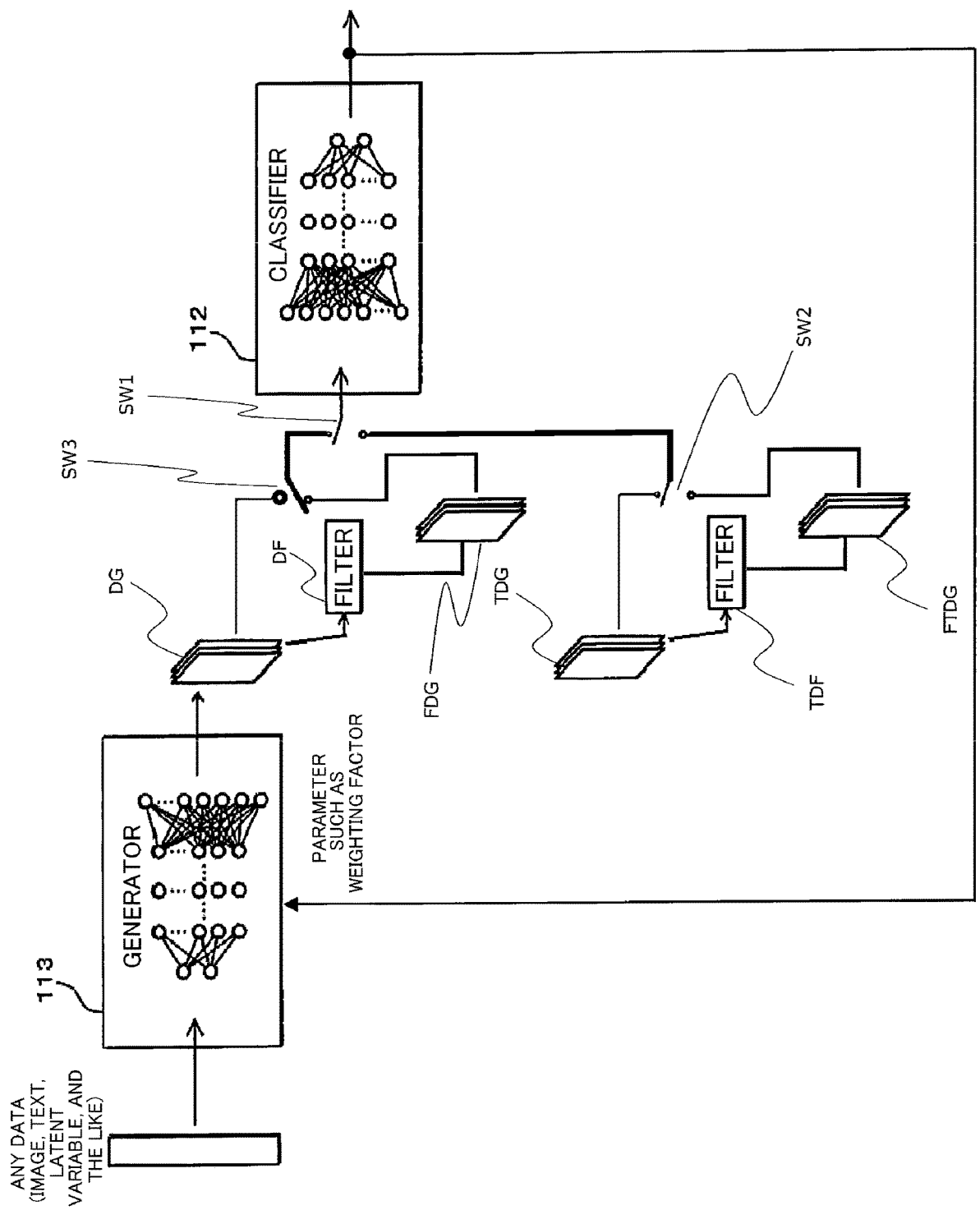
FIG. 9 is an explanatory diagram of learning of the classifier and the generator.

Further, as illustrated in FIG. 9, when learning of the classifier 112 or the generator 113 is performed, learning may be performed by inputting the image data PG generated by the generator 113 to the filter DF, switching a switch SW3 to reduce the information amount of a component that is difficult to visually judge from the generated image data, and then inputting the image data with the reduced information amount to the classifier 112.

As described before, learning of the generator 113 is not performed during learning of the classifier 112, and learning of the generator 113 is performed while parameters in the classifier 112 such as weights are fixed. In this case, loss functions defined by the classifier 112 and the generator 113 can be easily converged. However, definition data may be generated to cause learning of the classifier 112 and learning of the generator 113 to be performed simultaneously, and learning of them may be performed.

The control unit 10 determines whether the output result of the classifier 112 satisfies predetermined criteria by a function of the learning processing execution unit 101 (Step S10). When it is determined that the output result of the classifier 112 does not satisfy the predetermined criteria (S10: NO), the control unit 10 returns the process to Step S2 and repeats the processes in Steps S2 to S9.

When it is determined that the output result of the classifier 112 satisfies the predetermined criteria in Step S10 (S10: YES)/the learning process is ended. "Predetermined criteria" in Step S10 are, for example, whether the accuracy of the classifier 112 is decreased to half, that is, the classifier 112 cannot classify image data as image data derived from the generator 113 accurately. In another example, "predetermined criteria" are whether learning is performed a predetermined number of times or more. Other criteria may be used in order to determine whether learning has proceeded sufficiently.

Data in which a component that is difficult to visually judge has been reduced may be used in the following manner. A loss function in GAN includes a component of the classifier 112 and a component of the generator 113. In learning of the classifier 112 in Step S7 in the flowchart in FIG. 4, the component of the generator 113 is fixed and the component of the classifier 112 is optimized (maximized). In learning of the generator 113 in Step S9, only the component of the generator 113 is used.

In this case, in calculation of a loss function when the classifier 112 is learned in Step S7, the control unit 10 that functions as the learning processing execution unit 101 may acquire image data that is prepared in advance for learning without reducing the information amount thereof in place of Step S4, instead reduce the information amount at a predetermined ratio of image data output from the generator 113 acquired in Step S3, and give both image data to the classifier 112.

In this case, calculation of a loss function in learning of the generator 113 in Step S9 is performed without reducing the information amount in image data output from the generator 113 (without causing the image data output from the generator 113 to pass through a filter between the generator 113 and the classifier 112 in FIG. 3).

Further, in calculation of a loss function when the classifier 112 is learned in Step S7, the control unit 10 that functions as the learning processing execution unit 101 may reduce the information amount uniformly in image data that is prepared in advance in Step S4, further reduce the information amount at a predetermined ratio of image data output from the generator 113 acquired in Step S3, and give both image data to the classifier 112.

Meanwhile, in a case of learning of the generator 113, the control unit 10 that functions as the learning processing execution unit 101 may perform calculation of a loss function in learning of the classifier 113 in Step S9 by reducing the information amount at a predetermined ratio of output image data.

In this case, calculation of a loss function when the classifier 112 is learned in Step S7 is performed without reducing the information amount in both or either one of image data that is prepared in advance and image data output from the generator 113.

By performing learning that uses image data in which data has been reduced in this manner, image data generated by the generator 113 can be data having sufficient quality in appearance even if there is a left-out component in the data. That is, by omitting learning with regard to elements that do not have any influence visually, it is possible to employ the mechanism of human vision in a machine learning model.

As processing of omitting elements that do not have any influence visually, it is preferred that proven processing is performed which reduces data to such an extent that deterioration is not visually recognized, for example, DCT, as described in the present embodiment.

In the present embodiment, the classifier 112 is used for learning of the generator 113, and is learned as classifying images into an image generated by the generator 113 and an original image. Accordingly, the image processing execution unit 102 can generate image data that is comparable in appearance although information that does not have any influence visually is omitted and an SN ratio is low, by using the learned generator 113 and given seed data.

The classifier 112 is not limited thereto, and may be learned as a classifier that is used alone. In this case, image data in which a component that is difficult to judge by human eyes has been left out is used as at least a portion of data for learning selected in accordance with the purpose of use of the classifier 112. In addition, by omitting learning with regard to elements that do not have any influence visually in learning related to image data in a network including a CNN, it is possible to employ the mechanism of human vision in a machine learning model. The image processing execution unit 102 can determine whether an image conforms to the purpose of classification by using the learned classifier 112, irrespective of whether that image is image data in which the information amount has been reduced.

In the above embodiment, an example has been described in which GAN are configured as a machine learning model and image data is generated and classified. However, the machine learning model is not limited thereto. For example, in a machine learning model using audio data, an invention is possible such as learning by using data in which information that is difficult to judge by human hearing has been reduced.

It should be understood that the embodiment described above is only an example in all respects and is not a limitation to the present invention. It is intended that the scope of the present invention is not defined by the meaning described above but by the scope of claims and includes all variations in the meaning and the scope which are equivalent to the scope of claims.

REFERENCE SIGNS LIST 1 image processing device
10 control unit
101 learning processing execution unit
102 image processing execution unit
11 image processing unit
112 classifier
113 generator
12 storage unit
1P image processing program
121L DL library
122L classifier library
123L generator library
DG image data group
TDG training image data group
FTDG filtered training image data group
TDF, DF filter
SW switch

What is claimed is:

1. A learning method for a machine learning model that inputs or outputs image data, wherein a processor is configured to perform processes of:
a step of acquiring image data;
a step of converting the acquired image data into a frequency domain;
a step of inputting the image data to which the conversion is applied into a filter;
a step of reducing an information amount by leaving out high-frequency components that are difficult for human eye to visually judge in image data;
a step of generating data for learning including image data that does not leave out high-frequency components that are difficult to visually judge in which includes image data that leaves out the high-frequency components that are difficult to visually judge at a predetermined ratio; and
a step of learning the machine learning model with the generated data for learning.

2. A learning method for a machine learning model that is defined to, when image data is input, output a classification of the input image data, wherein a processor is configured to perform processes of:
a step of acquiring image data;
a step of converting the acquired image data into a frequency domain;
a step of inputting the image data to which the conversion is applied into a filter;
a step of reducing an information amount by leaving out high-frequency components that are difficult to visually judge in image data;
a step of generating data for learning including image data that does not leave out high-frequency components that are difficult to visually judge in which includes image data that leaves out the high-frequency components that are difficult to visually judge at a predetermined ratio; and
a step of learning the machine learning model as a classifier with the generated data for learning.

3. A learning method for
using a machine learning model for image generation that is defined to, when any data is input, output specific image data and
a machine learning model for classification that is defined to, when image data output from the machine learning model for image generation or other image data is input, output a classification of the input image data, and
using data for learning that includes image data in which a component that is difficult to visually judge is left out to reduce an information amount at a predetermined ratio,
learning the machine learning model for classification and the machine learning model for image generation by GAN (Generative Adversarial Networks) using data for learning;
wherein a processor is configured to perform processes of:
a step of acquiring image data;
a step of converting the acquired image data into a frequency domain;
a step of inputting the image data to which the conversion is applied into a filter;
a step of reducing an information amount by leaving out high-frequency components that are difficult for human eye to visually judge in image data;

a step of generating the data for learning including image data that does not leave out high-frequency components that are difficult to visually judge in which includes image data that leaves out the high-frequency components that are difficult to visually judge at a predetermined ratio; and a step of generating the data for learning including image data output from the filter at a predetermined ratio.

4. The learning method according to claim 3, wherein the processor is further configured to perform processes of:
a step of calculating a loss function of the machine learning model for the classification by using the data for learning.

5. The learning method according to claim 3, wherein the processor is further configured to perform processes of:
a step of setting a loss function of the machine learning model for image generation by using a determination result of the machine learning model for classification learned by the data for learning.

6. The learning method according to claim 1, wherein the processor is further configured to perform processes of:
a step of calculating a loss function of a machine learning model that outputs image data by using a determination result of the machine learning model for classification learned by the data for learning.

7. A recording medium for recording computer program that causes a processor to perform processes of:
a step of storing therein definition data of a machine learning model that is defined to, when image data is input, output a classification of an image based on the image data and generating the machine learning model based on the definition data;
a step of acquiring image data;
a step of converting the acquired image data into a frequency domain;
a step of reducing an information amount by leaving out high-frequency components that are difficult for human eye to visually judge in image data by inputting the image data to which the conversion is applied into a filter;
a step of generating data for learning including image data output from the filter and image data that does not reduce information amount at a predetermined ratio; and
a step of giving the generated data for learning and learning the machine learning model as a classifier.

8. A recording medium for recording computer program that causes a processor to perform processes of:
a step of storing therein definition data of a machine learning model for image generation that is defined to, when any data is input, output specific image data and definition data of a machine learning model for classification that is defined to, when image data output from the machine learning model for image generation or other image data is input, output a classification of an image based on the input image data, and generating the machine learning model for classification based on the definition data;
a step of generating the machine learning model for image generation based on the definition data;
a step of acquiring image data given to the machine learning model for classification;
a step of converting the acquired image data into a frequency domain;
a step of reducing an information amount by leaving out high-frequency components that are difficult for human eye to visually judge in image data in a predetermined ratio of the image data within the image data to which the conversion is applied;
a step of generating data for learning that includes the image data with the reduced information amount and the image data without the reduced information amount at a predetermined ratio; and
a step of learning the machine learning model for classification and the machine learning model for image generation by GAN using the generated data for learning.

9. A classifier comprising:
an input layer to which image data is input;
an output layer that outputs a classification of an image based on the image data; and
an intermediate layer that includes a machine learning model, wherein
the classifier is learned by causing a processor to perform processes of:
a step of acquiring image data;
a step of converting the acquired image data into a frequency domain;
a step of reducing an information amount by leaving out high-frequency components that are difficult for human eye to visually judge in image data within the image data to which the conversion is applied;
a step of generating image data for learning that includes the image data with the reduced information amount and the image data without the reduced information amount at a predetermined ratio; and
a step of learning the machine learning model as a machine learning model for classification with a training data including the generated image data for learning and a classification label of the image data.

10. A generator comprising:
an input layer to which any data is input;
an output layer that outputs image data of an image generated based on the data; and
an intermediate layer that includes a machine learning model, wherein
the generator is learned by GAN including a machine learning model for classification that performs classification whether image data output from the output layer is the image data output from the output layer, and
the generator is learned to cause a processor to output image data based on any input data
wherein the machine learning model for the classification is learned by causing the processor to perform processes of:
a step of acquiring data output from the output layer or image data given to the learning model for classification;
a step of converting the acquired image data into a frequency domain;
a step of reducing an information amount by leaving out high-frequency components that are difficult for human eye to visually judge in image data within the image data to which the conversion is applied;
a step of generating image data for learning that includes the image data with the reduced information amount and the image data without the reduced information amount at a predetermined ratio; and
a step of learning the machine learning model for classification with the generated data for learning.

* * * * *